Figure 1:
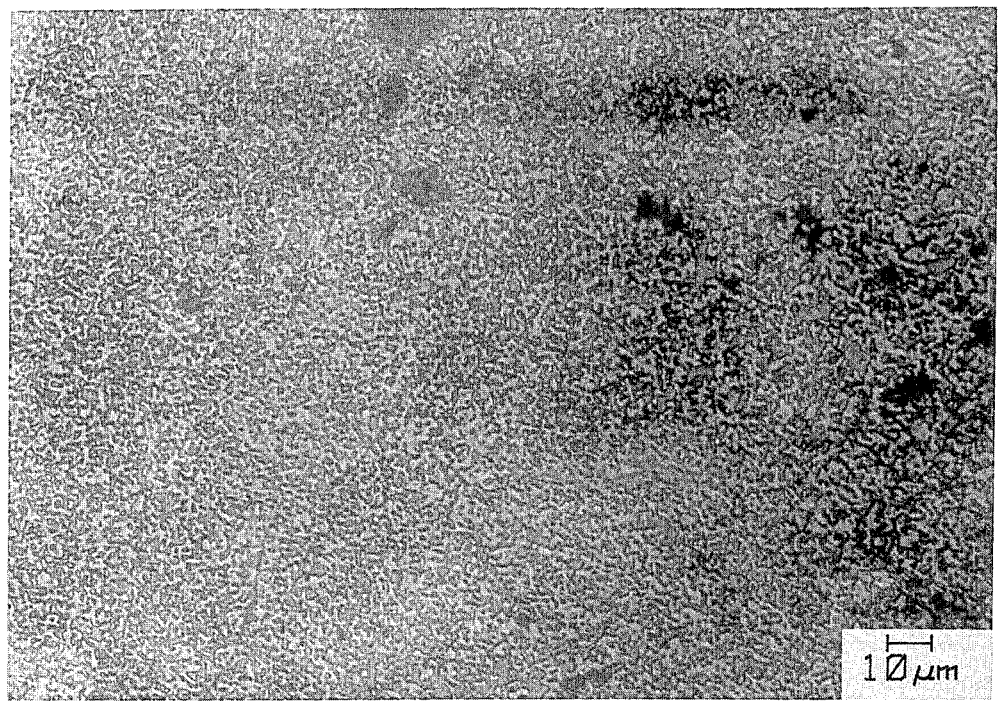

United States Patent [19]

Hodge

[11] Patent Number: 4,526,876
[45] Date of Patent: Jul. 2, 1985

[54] MULLITE-BETA SPODUMENE COMPOSITE CERAMIC

[75] Inventor: James D. Hodge, Cohoes, N.Y.

[73] Assignee: General Electric Company, Schenectady, N.Y.

[21] Appl. No.: 634,768

[22] Filed: Jul. 30, 1984

[51] Int. Cl.³ .............................................. C04B 35/18
[52] U.S. Cl. ..................................... 501/128; 264/62; 264/65; 264/66; 501/153
[58] Field of Search ...................... 501/128, 153, 4, 7; 264/62, 65, 66

[56] References Cited

U.S. PATENT DOCUMENTS 3,279,930 10/1966 Van Der Beck .................... 501/153
3,480,454 11/1969 Spachman ........................... 501/128
3,943,064 5/1976 Ballain et al. ....................... 501/128
4,279,654 7/1981 Yajima et al. ......................... 264/62
4,301,214 11/1981 Crandall ............................. 501/144

FOREIGN PATENT DOCUMENTS 1033490 6/1978 Canada ................................. 501/1
1063193 3/1967 United Kingdom.

OTHER PUBLICATIONS

Mussler, B. H. et al., "Preparation and Properties of Mullite-Cordierite Composites", Ceramic Bulletin, 63(5), pp. 705-710 (1984).
Leipold et al, J. Amer. Ceramic Society, pp. C-14-7-C-149 (1982) "Development of Low-Thermal Expansion Mullite Bodies".
Fiori et al, "Collogque International sur les Nouvelles Orientations des Compososants Possifs", pp. 203-210, Paris, Mar. 29-Apr. 1, 1982.

Primary Examiner—Helen M. McCarthy
Attorney, Agent, or Firm—Jane M. Binkowski; James C. Davis, Jr.; James Magee, Jr.

[57] ABSTRACT

Method for producing a polycrystalline body comprised of from about 50% by weight to about 95% by weight of crystalline mullite and from about 5% by weight to about 50% by weight of crystalline beta spodumene, said body having a density greater than 85% of its theoretical density.

15 Claims, 3 Drawing Figures

MULLITE-BETA SPODUMENE COMPOSITE CERAMIC

The present invention relates to the production of a polycrystalline body, i.e. a composite ceramic, comprised of a crystalline mullite phase and a crystalline beta spodumene phase. In a preferred embodiment, the present invention relates to the production of a polycrystalline material comprised of mullite and beta spodumene useful as a substrate for silicon with a thermal expansion coefficient identical or close to that of silicon.

To minimize stress at the silicon-substrate interface of an IC device during operation, it is desired that the substrate material have a thermal expansion coefficient which matches that of silicon as closely as possible. Such a match is expected to be especially critical in projected high power semiconductor devices where heating and cooling cycles during operation of the device are expected to subject the silicon-substrate interface to more severe thermal stresses than are encountered in present devices. Present technology utilizes alpha alumina as the substrate material. However, the thermal expansion mismatch between alumina and silicon is judged to be too great for this material to be satisfactory for future applications. In addition, high speed integrated circuits require a substrate material with a low dielectric constant. For projected high speed devices, alumina is judged to have too high of a dielectric constant. A replacement substrate material for alumina is then needed whose thermal expansion coefficient provides a closer match to that of silicon and whose dielectric constant is lower than that of alumina.

Mullite composite substrate materials have been investigated in the past. Leipold and Sibold, J. Amer. Ceram. Soc., 65, C147 (1982), report making a two phase mullite based ceramic with a thermal expansion coefficient close to that of silicon by preparing a silica-rich mullite composition. After firing, this resulted in a body consisting of mullite and a silica-rich glass which contained approximately 50% glass. Fiori and Vincenzini, "Collogque Internationale sur les Nouvelles Orientations des Compososants Possifs", p. 203, Paris, March 29–Apr. 1, 1982, also report making similar mullite-silica glass compositions for use as a substrate material with a thermal expansion to match that of silicon.

Mullite is a crystalline aluminum silicate phase which has the approximate chemical formula, $3 Al_2O_3 \cdot 2SiO_2$. It is a potential substrate material as its thermal expansion coefficient is a reasonable match for that of silicon ($3.3 \times 10^{-6}/°K$. at 300° K. for mullite vs. $2.5 \times 10^{-6}/°K$. at 300° K. for silicon). However, as discussed above, a closer match than this is desired for substrates for projected high power devices. Therefore, according to one aspect of the present invention, the thermal expansion coefficient of mullite is lowered to match that of silicon through the addition of a second phase having a low thermal expansion coefficient. Specifically, in accordance with the present invention, beta spodumene (a lithium aluminum silicate) is added. Beta spodumene has a thermal expansion coefficient of $0.9 \times 10^{-6}/°K$. between 293° K. and 1273° K.

Those skilled in the art will gain a further and better understanding of the present invention from the detailed description set forth below, considered in conjunction with the figures accompanying and forming a part of the specification, in which:

FIG. 1 is a photomicrograph (magnified 750×) showing the polished cross-section of a composite ceramic produced in accordance with the present invention comprised of about 63.0% by weight of mullite phase (lighter phase), and about 37.0% by weight of beta spodumene phase (darker colored phase).

Figure 2:
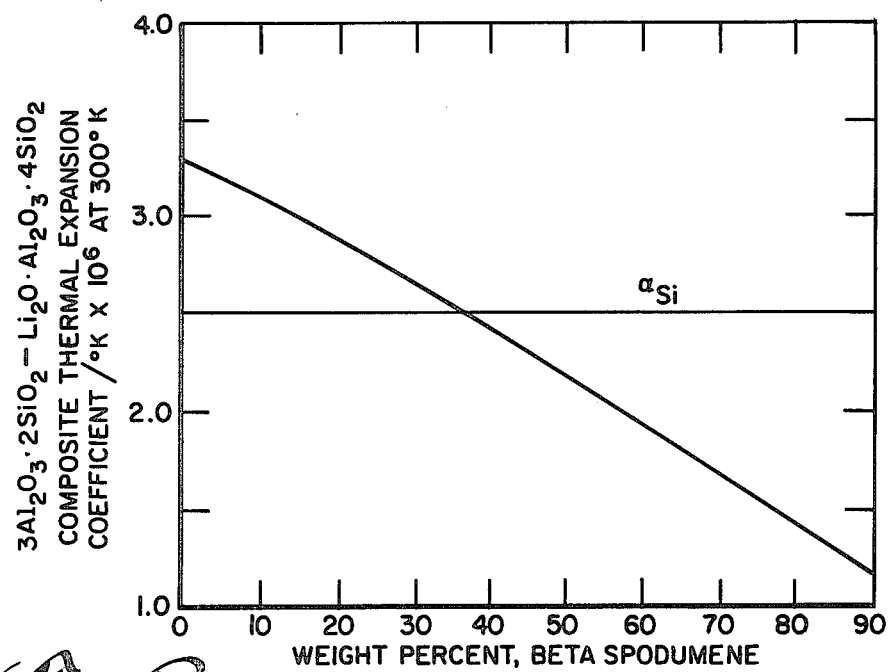
Figure 3:
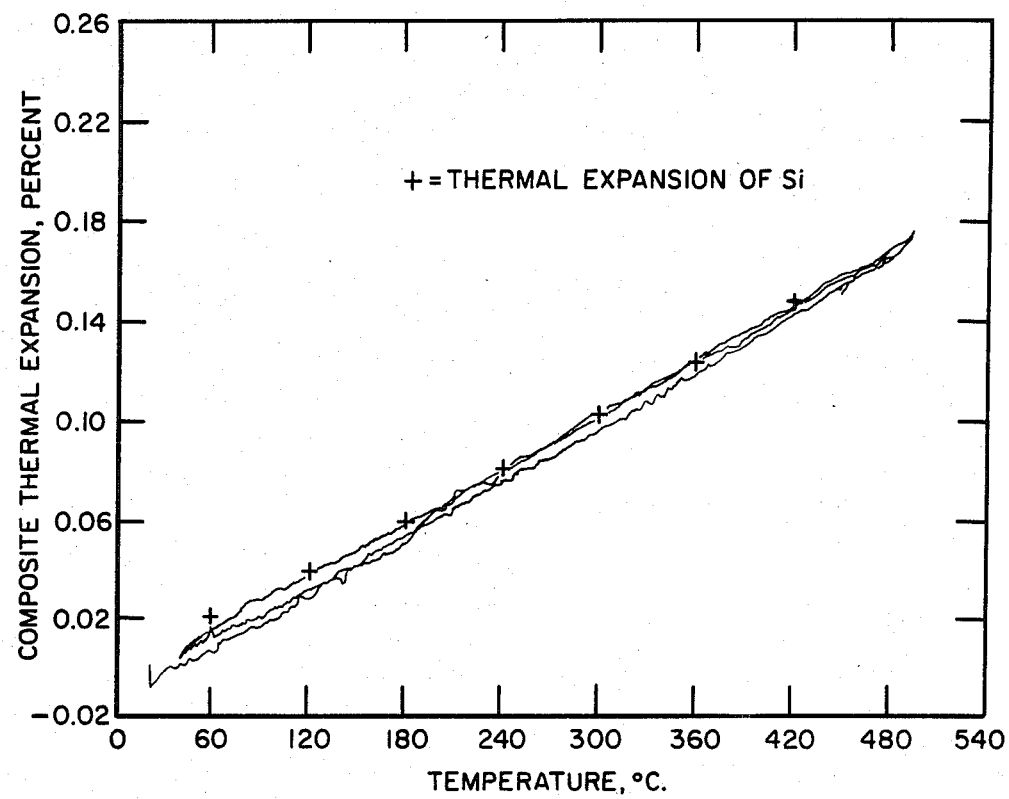

FIG. 2 is a graph showing the calculated thermal expansion coefficient of the present polycrystalline body as a function of its beta spodumene content. Specifically, in FIG. 2, using the formula for the thermal expansion coefficient for a multiphase body originally derived by Turner, J. Res. NBS, 37, 239 (1946), the thermal expansion coefficient of a mullite-beta spodumene ceramic was calculated at 300° K. FIG. 2 shows the results of such a calculation compared with the thermal expansion coefficient of silicon at 300° K. shown as $\alpha_{Si}$ in FIG. 2. These calculations indicate that for the present composite ceramic to match the thermal expansion of silicon, it would need to have a content of about 37 weight % beta spodumene, and FIG. 3 shows the thermal expansion of Si (x) reported in the literature at the given temperatures. All of the solid lines in FIG. 3 were produced by means of a dilatometer by heating the present polycrystalline body produced in Example 11 herein from about 25° C. to about 500° C., cooling back down to about 50° C. and then heating back up to about 500° C., i.e. it was measured between about 298° K. to about 773° K. In FIG. 3, the present polycrystalline body had a density of 94.9% of its theoretical density, and X-ray diffraction analysis showed it to be comprised of about 63% by weight of mullite phase and about 37% by weight of beta spodumene phase and a trace of $\alpha$-$Al_2O_3$. FIG. 3 shows that the present polycrystalline body had a thermal expansion coefficient at temperatures ranging from about 25° C. to about 500° C. which matched that of Si, or which was within about 5% of that of silicon, or which was within about 10% of that of silicon.

In accordance with the present invention, a mullite-beta spodumene ceramic can be fabricated to match the thermal expansion coefficient of silicon. An advantage of the present mullite-beta spodumene ceramic over the mullite-glass ceramics is that the present ceramic has a potentially higher thermal conductivity because of the higher thermal conductivity of the crystalline ceramics over the glass.

Briefly stated, the present process for producing a polycrystalline body comprised of from about 50% by weight to about 95% by weight crystalline mullite and from about 5% by weight to about 50% by weight crystalline beta spodumene comprises providing a mixture comprised of mullite and/or beta spodumene and/or $Al_2O_3$ and/or $SiO_2$ and/or a precursor for $Li_2O$, said mixture having a composition required to produce said polycrystalline body, shaping said mixture into a compact, sintering said compact at a temperature ranging from greater than about 1423° C. to about 1500° C. at which sufficient liquid phase is generated to liquid phase sinter the compact and produce a densified body having a density greater than about 85% of the theoretical density of said body, said sintering temperature having no significant deleterious effect on said body, said sintered body containing said mullite phase and a glassy phase of said beta spodumene, nucleation-annealing said sintered body at a temperature ranging from about 600° C. to about 800° C. to nucleate said glassy beta spodumene phase, crystallization-annealing the resulting nucleated body at a temperature ranging from about 1200° C. to below the temperature at which liquid forms in said body to produce said polycrystalline body, said sintering, said nucleation-annealing and said crystallization-annealing being carried out in an atmosphere or vacuum which has no significant deleterious effect on said compact or body.

The % density given herein for a sintered or fired body is, unless otherwise stated, the fractional density of the theoretical density of mullite and beta spodumene based on the particular amounts of mullite and beta spodumene present.

In the present invention, the composition of the mullite phase is one which can exist in thermodynamic equilibrium with a beta spodumene phase. Likewise, the composition of the beta spodumene phase is one which can exist in thermodynamic equilibrium with the mullite phase. The present polycrystalline body, therefore, is comprised of a mullite phase composed of from about 71.8 weight % to about 74.0 weight % $Al_2O_3$ balance $SiO_2$, and a beta spodumene phase comprised of a lithium aluminum silicate having a nominal formula of $Li_2O.Al_2O_3.4SiO_2$ and being composed of from about 58.5 weight % to about 79.4 weight % silica balance lithium aluminate ($Li_2O.Al_2O_3$).

In the present invention, the specific phase composition of the present polycrystalline body depends largely on its final application. In one embodiment of the present invention, the phase composition of the present polycrystalline body is tailored to match the thermal expansion coefficient of silicon at 300° K.

In carrying out the present process, there is provided a particulate mixture comprised of the components, i.e. mullite and/or beta spodumene and/or $Al_2O_3$ and/or $SiO_2$ and/or a precursor for $Li_2O$, and such mixture has a composition required to produce the present polycrystalline body. For example, the mixture can be comprised of powders of $Al_2O_3$, $SiO_2$ and a precursor for $Li_2O$. Alternatively, for example, the mixture can be comprised of powders of prepared beta spodumene and mullite. Also, for example, the mixture can be comprised of combinations of powders of $Al_2O_3$ and/or $SiO_2$ and/or a precursor for $Li_2O$ and/or beta spodumene and/or mullite. The particular amounts of the components used in forming the present particulate mixture is determined by the particular phase composition desired in the present polycrystalline body. In the present process, there is no significant loss of any of the reactants, i.e. $Al_2O_3$, $Li_2O$, $SiO_2$, mullite powder or beta spodumene powder forming the mullite and beta spodumene phases in the present polycrystalline body.

The precursor for $Li_2O$ should have no significant deleterious effect in the present invention. Specifically, it should thermally decompose completely at a temperature below 900° C., and preferably below 500° C., producing $Li_2O$ and gaseous product or products of decomposition which vaporize away before sintering of the compact is initiated. Representative of suitable precursors for $Li_2O$ are lithium nitrate, lithium acetate and lithium hydroxide.

The components of the mixture can be of commercial or technical grade. Specifically, they should not contain any impurities which would have a significantly deleterious effect on the properties of the resulting polycrystalline body. The larger the amount of impurities in the starting materials, the greater is the amount of glassy phase in the final product.

In carrying out the present process, a uniform or at least a substantially uniform particulate mixture or dispersion of the components is formed. The present mixture can be formed by a number of conventional techniques such as, for example, ball milling or jet milling. Representative of the mixing techniques is ball milling, preferably with balls of a material such as $\alpha$-$Al_2O_3$ which has low wear and which has no significant detrimental effect on the properties desired in the final product. Preferably, milling is carried out in a liquid mixing medium which is inert to the ingredients. Typical liquid mixing mediums include hydrocarbons such as benzene and chlorinated hydrocarbons. The resulting wet milled material can be dried by a number of conventional techniques to remove the liquid medium. Preferably, it is dried in an oven maintained just below the boiling point of the liquid mixing medium. Spray-drying can also be used.

The present particulate mixture should have a particle size which produces the present polycrystalline body. Preferably, the present mixture has an average particle size which is submicron. Larger particle sizes, generally greater than about 5 microns, have a tendency to lower densification. In the present mixture, components other than powders of mullite and beta spodumene should be of a size which allows the present reaction to take place, i.e. formation of mullite and beta spodumene phases.

A number of techniques can be used to shape the particulate mixture into a compact. For example, the mixture can be extruded, injection molded, die-pressed, isostatically pressed, slip cast or tape cast to produce the compact of desired shape. Any lubricants, binders or similar material used in shaping the mixture should have no significant deleterious effect on the compact or the resulting polycrystalline body. Such materials are of the type which evaporate away on heating at temperatures below the present sintering temperature, and preferably below 200° C., leaving no significant residue or any effective contaminants.

The shaped compact can be in any desired form. For example, it can be simple, hollow and/or complex in shape. Preferably, for use as a substrate, it is in the form of a tape.

The compact is sintered at a temperature at which sufficient liquid phase is generated to carry out the present liquid phase sintering and such sintering temperature can range from greater than about 1423° C. to about 1500° C. The sintering temperature should have no significantly deleterious effect on the compact or body, i.e., the sintering temperature should not generate so much liquid phase as to slump the compact or body. Specifically the particular sintering temperature used depends largely on the amount of liquid phase generated at such temperature for the particular composition of the compact. For the present composition, the sintering temperature is one at which beta spodumene is molten, and in such instance it ranges from higher than about 1423° C. to about 1500° C. Temperatures higher than about 1500° C. are not operable because they generate so much liquid phase as to slump the compact or body. With increasing temperatures, increasing amounts or mullite dissolve in the molten beta spodumene generating more liquid at the higher sintering temperatures.

The present sintering is carried out to produce a sintered body having a density greater than about 85% of its theoretical density, i.e. greater than about 85% of the weighted average theoretical density for mullite and beta spodumene based on the amounts thereof present.

Preferably, the present sintering is carried out to produce a sintered body having a density greater than 90%, and more preferably greater than 95%, of the theoretical density of said body. Sintering time is determinable empirically. Generally, a sintering time of about 30 minutes to five hours is satisfactory.

The sintered body is comprised of crystalline mullite phase and a glassy beta spodumene phase with some metastable lithium aluminum silicates also present and, depending on its composition, possibly some $\alpha$-$Al_2O_3$ phase. Generally, the metastable lithium aluminum silicates are present in an amount ranging from about 10% by volume to about 15% by volume of the sintered body. These metastable lithium aluminum silicates decompose into beta spodumene during the present crystallization annealing and are not present in the present polycrystalline body. The sintered body is nucleation-annealed to nucleate the glassy beta spodumene phase sufficiently to allow its crystallization to produce the present polycrystalline body. Specifically, the sintered body is annealed at a temperature ranging from about 600° C. to about 800° C., preferably from about 650° C. to about 750° C., and most preferably, it is annealed at about 700° C. At a temperature below about 600° C., the rate of nucleation is too slow to be useful whereas a temperature higher than about 800° C. is not operable in the present process.

Nucleation-annealing time is determinable empirically by standard techniques such as, for example, by observations of the degree to which the final product is crystallized. Generally, a nucleation-annealing time period of about two hours is satisfactory at about 700° C.

The nucleation-annealed sintered body is then crystallization-annealed to crystallize the nucleated glassy beta spodumene phase to produce the present polycrystalline body. Specifically, the nucleation-annealed sintered body is crystallization-annealed at a temperature ranging from about 1200° C. to a temperature at which the body remains totally solid, i.e. below about 1423° C., preferably from about 1200° C. to about 1300° C., and most preferably, it is about 1300° C. There appears to be no significant advantage in using crystallization annealing temperatures higher than about 1300° C.

Crystallization-annealing time is determinable empirically by standard techniques such as, for example, by observations of the degree to which the final product is crystallized. Generally, a crystallization-annealing time ranging from about two to ten hous is satisfactory. Longer annealing times reduce the amount of $\alpha$-$Al_2O_3$ phase in the final body if it is present.

The present sintering, nucleation-annealing and crystallization-annealing is carried out in an atmosphere which has no significantly deleterious effect on the compact or body. Representative of a useful atmosphere is air, hydrogen, wet hydrogen, nitrogen, argon and mixtures thereof. The sintering and annealing atmosphere is preferably at ambient pressure since there is no advantage in using a pressure higher than ambient. Sintering can also be carried out in a vacuum which has no significant deleterious effect on the compact or body.

In one preferred embodiment, the present sintering, nucleation-annealing and crystallization-annealing are carried out in a single run using the same atmosphere or vacuum throughout the run.

The present polycrystalline body is a pressureless sintered ceramic body. By pressureless sintering herein it is meant the densification or consolidation of the compact or shaped body at ambient pressure or under a vacuum, i.e. without the application of mechanical pressure, into a body having a density greater than 85% of its theoretical density.

The present polycrystalline body has a density greater than about 85% of its theoretical density, i.e. greater than 85% of the weighted average theoretical density for mullite and beta spodumene based on the amounts thereof present in the body. Preferably, the present polycrystalline body has density greater than 90%, and more preferably greater than 95%, of the theoretical density of said body.

The present polycrystalline body has a number of uses, but because of its relatively low thermal expansion coefficient and dielectric constant, it is particularly useful as a substrate material, especially as a supporting substrate for semiconductors in information processing equipment such as computers. Specifically, the present polycrystalline body has a thermal expansion coefficient of less than $3.3 \times 10^{-6}/°$ K. at 300° K., and its thermal expansion coefficient decreases as its content of beta spodumene increases. This is illustrated by the calculated graph of FIG. 2. The present polycrystalline body containing about 5% weight beta spodumene would have a thermal expansion coefficient of about $3.2 \times 10^{-6}/°$ K. at 300° K., and the present body containing about 50% by weight beta spodumene would have a thermal expansion coefficient of about $2.2 \times 10^{-6}/°$ K. at 300° K.

The present polycrystalline body has a dielectric constant ranging from higher than 6 to lower than 7 at 300° K. The dielectric constant is a function of the amount of beta spodumene present. The more beta spodumene present, the lower is the dielectric constant of the present body.

The present polycrystalline body is comprised of mullite and beta spodumene phases, and more specifically, it has a phase composition comprised of polycrystalline mullite in an amount ranging from about 50% by weight to about 95% by weight of the total weight of the body and polycrystalline beta spodumene in an amount ranging from about 5% by weight to about 50% by weight of the total weight of the body.

In a preferred embodiment, the present polycrystalline body has a phase composition comprised of polycrystalline mullite ranging from about 60% by weight to about 70% by weight of the total weight of the body, and polycrystalline beta spodumene, ranging from about 30% by weight to about 40% by weight of the total weight of the body, and has a thermal expansion coefficient within about 10% of that of silicon at 300° K.

In a more preferred embodiment, the present polycrystalline body has a phase composition comprised of about 63% by weight of polycrystalline mullite and about 37% by weight of polycrystalline beta spodumene, and has a thermal expansion coefficient within about 5% of that of silicon at 300° K.

The present polycrystalline body can contain a glassy phase in an amount of less than about 5% by volume, preferably less than about 2% by volume, and more preferably less than about 1% by volume, of the total volume of said body. Even more preferably, the present polycrystalline body contains only a detectable amount of glassy phase. Therefore, glassy phase in the present polycrystalline body can range from a detectable amount up to about 5% by volume of the total volume of the body. The amount of glassy phase present in the present polycrystalline body depends largely on the impurities in the starting materials.

The present polycrystalline body may contain a phase of $\alpha$-$Al_2O_3$ ranging up to about 11% by weight of the total weight of the body. This is due to the fact that since the mullite-beta spodumene join intersects an alumina crystallization field, alumina may precipitate at the sintering temperatures used depending largely on the $SiO_2$ content of the body and the relative amounts of mullite and beta spodumene phases therein. For example, when the body contains about 80% by weight mullite phase and about 20% by weight beta spodumene phase and has an $SiO_2$ content of about 36.0% by weight, about 4% by weight of $\alpha$-$Al_2O_3$ phase can form therein but when its $SiO_2$ content is increased to 37.0% by weight, no $\alpha$-$Al_2O_3$ phase will form therein. Also, when the $SiO_2$ content of the body is greater than about 53.6% by weight, no $\alpha$-$Al_2O_3$ phase will form therein.

More particularly, when the present more preferred polycrystalline body comprised of about 63% by weight mullite phase and about 37% by weight beta spodumene phase has a $SiO_2$ content of about 44.5% by weight of the total weight of the body, it can contain $\alpha$-$Al_2O_3$ phase in an amount detectable by X-ray diffraction analysis. When such more preferred polycrystalline body has a $SiO_2$ content of about 45.8% by weight, any $\alpha$-$Al_2O_3$ phase which it may contain is not detectable by X-ray diffraction analysis. However, when such more preferred polycrystalline body has a $SiO_2$ content of at least about 47.0% by weight and higher, it does not contain $\alpha$-$Al_2O_3$ phase.

The $SiO_2$ content of the present body, i.e. sintered, annealed as well as the present polycrystalline body, ranges from about 29.7% by weight to about 53.8% by weight of the total weight of the body. By $SiO_2$ content of the present body, it is meant herein the total $SiO_2$ content therein, i.e. it is the total of $SiO_2$ contained in the mullite and beta spodumene phases and in any glassy phase. The present polycrystalline body does not contain a phase of $SiO_2$.

The present polycrystalline body can be annealed at a temperature ranging from about 1200° C. to below the temperature at which liquid forms in said body in the same atmosphere used for the present crystallization-annealing, to reduce its content of $\alpha$-$Al_2O_3$ phase.

In a preferred embodiment, alumina precipitation, i.e. formation of $\alpha$-$Al_2O_3$ phase in the body is reduced or eliminated by increasing the $SiO_2$ content of the starting particulate mixture by an amount which is determinable empirically for the particular composition. Preferably, the $SiO_2$ content of the particulate mixture is increased by adding silica thereto. By $SiO_2$ content of the present particulate mixture, it is meant herein the total $SiO_2$ content in the mixture in any form such as mullite powder, beta spodumene powder as well as silica powder. The present particulate mixture has an $SiO_2$ content ranging from about 29.7% by weight to about 53.8% by weight of the total weight of the mixture.

In the present polycrystalline body, the phases are distributed uniformly, substantially uniformly or at least significantly uniformly. Also, the present polycrystalline body has a uniform, substantially uniform or at least a significantly uniform microstructure.

The beta-spodumene phase in the present polycrystalline body can be discontinuous or continuous. Specifically, in the present polycrystalline body, when the beta-spodumene phase ranges from about 5% by weight to about 10% by weight of the body, it is discontinuous. As the beta-spodumene phase increases in amount from 10% by weight of the body, it exhibits some continuity, and at about 15% by weight of the body, it is likely to be continuous and interconnecting. The beta-spodumene phase ranging in amount from in excess of 15% by weight to about 50% by weight of the body is continuous and interconnecting.

The present polycrystalline body can be in any desired form. For example, it can be simple, hollow and/or complex in shape. Preferably, for use as a substrate, it is in the form of a sheet.

The invention is further illustrated by the following examples wherein the procedure was as follows unless otherwise stated:

All firing of the compact or body was carried out in a molybdenum disilicide resistance furnace.

At the end of each run, the power was switched off and the body was furnace-cooled to room temperature.

% Density of a sintered or fired body, given herein, is fractional density using 2.822 g/cm which is the theoretical density for 37% by weight beta spodumene (2.38 g/cc) and 63% by weight mullite (3.19 g/cc).

The weight % of mullite and of beta spodumene is based on the composition of the starting mixture since there is no significant weight loss between the green and sintered or fired forms of the body in the present process.

Density was measured by a standard immersion technique using isopropyl alcohol as the fluid.

Phase composition of the final product was determined by standard metallographic techniques such as optical microscopy and/or X-ray diffraction analysis.

Thermal expansion coefficient was measured in a calibrated alumina dilatometer at the given temperature.

EXAMPLE 1

Mullite powder (99.9pure) composed of 71.8 weight % $Al_2O_3$ balance $SiO_2$ and having an average particle size of about 0.2 micron was used.

Beta spodumene powder (99.9% pure) composed of 8.0 weight % $Li_2O$, 27.5 weight % $Al_2O_3$ and 64.5 weight % $SiO_2$ and having an average particle size of about 0.5 micron was used.

About 63% by weight of the mullite powder and about 37% by weight of the beta spodumene powder were ball-milled using alumina media in acetone with a polyacrylic acid added as a dispersant. After milling for 3 hours, the solvent was removed by drying in air at about 40° C. The resulting particulate mixture was substantially uniform and had an average particle size of less that about $0.5\mu$.

The particulate mixture was pressed into pellets at ambient temperature under a pressure of about 20,000 psi. Each pellet was in the form of a disc of substantially the same size of about ½ inch in diameter and about ⅛ inch in thickness.

One disc was sintered at 1450° C. for five hours. The temperature was then lowered to 700° C. where it was held for 2 hours to nucleate the glassy beta spodumene phase. The temperature was then raised to 1300° C. where it was held for 2 hours to crystallize the beta spodumene phase. The disc was then furnace cooled to ambient temperature. All firing, i.e. sintering, nucleation- and crystallization-annealing was carried out in oxygen at ambient pressure, and the fired disc was furnace cooled in the same atmosphere.

The fired disc, i.e. the present polycrystalline body, had a density of about 92.5% of its theoretical density. X-ray diffraction analysis showed that it was comprised of about 60% by weight of crystalline mullite, about 35% by weight of crystalline beta spodumene and about 5% by weight of $\alpha$-$Al_2O_3$ phase.

Since the fired disc contained about 5% by weight of $\alpha$-$Al_2O_3$ phase, the composition of its mullite and beta spodumene phases differed slightly from that of the starting mullite and beta spodumene powders, i.e. the composition of its crystalline mullite and crystalline beta spodumene phases would be within about 5% by weight of the composition of the starting mullite and beta spodumene powders.

From other experiments, it was known that this fired disc, i.e. the present polycrystalline body, had a thermal expansion coefficient within about 10% of that of silicon at 300° K. and a dielectric constant higher than 6 but lower than 7 at 300° K.

This disc would be useful as a supporting substrate for a silicon chip for use in ceramic packaging for use in computers.

This example is illustrated in Table I.

Examples 2-14 of Table I were carried out in substantially the same manner as Example 1 except as noted in Table I and except as noted herein. Specifically, in Table I, all of the starting powders of beta spodumene and mullite were of the same composition and size except the mullite powder of Example 12 where the mullite powder had an average particle size from greater than 5 to 10 microns.

In Examples 1-5, 7, 8 and 11-14, the starting beta spodumene and mullite powders comprised 37% by weight beta spodumene and 63% by weight mullite. However, in Examples 13 and 14, excess silica was added, i.e. in Example 13 the $SiO_2$ was added to form a mixture of mullite, beta spodumene and silica wherein the silica was 4.5 weight % of the total mixture, and in Example 14 the $SiO_2$ was 7.0 weight % of the total particulate mixture.

In Table I, the starting $\alpha$-$Al_2O_3$ powder had an average particle size of about 0.15 micron, the starting $SiO_2$ powder had an average particle size of about 1.0 micron, and the starting $LiOH \cdot H_2O$ powder had an average particle size of about 1.0 micron, and all of these powders were greater than 99% pore.

In Examples 6, 9 and 10, the starting powders were used in proportions which produced the given composition of the particulate mixture.

In Table I, each particulate mixture was substantially uniform and had an average particle size of less than about 0.5 micron except in Example 12 where it had an average particle size greater than one micron.

In Examples 2-14, all firing, i.e. sintering, nucleation-annealing and crystallization annealing, was carried out in air at ambient pressure, and the fired body was furnace cooled in air to ambient temperature.

In Examples 11, 13 and 14, the green disc, i.e. green body, was fired in air at ambient pressure at 1400° C. for 2 hours, and then the temperature was raised to the given sintering temperature for the given time period.

The resulting fired discs, i.e. the final fired bodies, of Examples 1-6, 8, 11, 13 and 14 were analyzed by X-ray diffraction analysis and their phase composition is shown in Table I.

TABLE 1

| Ex. | Starting Powders | Composition of Particulate Mixture | | | Sintering | | Nucleation Annealing | | Crystallization Annealing | | Firing Atmosphere | Density % theo. |
|---|---|---|---|---|---|---|---|---|---|---|---|---|
| | | $Al_2O_3$ wt % | $SiO_2$ wt % | $Li_2O$ wt % | Temp. °C. | Time hr. | Temp. °C. | Time hr. | Temp. °C. | Time hr. | | |
| 1 | $\beta$-spodumene, mullite | 55.4 | 41.6 | 3.0 | 1450 | 5 | 700 | 2 | 1300 | 2 | $O_2$ | 92.5 |
| 2 | " | 55.4 | 41.6 | 3.0 | 1450 | 0.5 | 700 | 2 | 1200 | 5 | Air | 94.4 |
| 3 | " | 55.4 | 41.6 | 3.0 | 1450 | 0.5 | 700 | 2 | 1100 | 5 | Air | — |
| 4 | " | 55.4 | 41.6 | 3.0 | 1450 | 5 | none | | 1300 | 2 | Air | 94.0 |
| 5 | " | 55.4 | 41.6 | 3.0 | 1450 | 5 | none | | none | | Air | 93.2 |
| 6 | $\beta$-spodumene, $\alpha$-$Al_2O_3$, $SiO_2$ | 55.4 | 41.6 | 3.0 | 1400 | 5 | none | | none | | Air | 89.4 |
| 7 | $\beta$-spodumene, mullite | 55.4 | 41.6 | 3.0 | 1400 | 5 | none | | none | | Air | 73.8 |
| 8 | " | 55.4 | 41.6 | 3.0 | 1500 | 5 | none | | none | | Air | 92.2 |
| 9 | $LiOH \cdot H_2O$, $\alpha$-$Al_2O_3$, $SiO_2$ | 55.4 | 41.6 | 3.0 | 1450 | 5 | none | | none | | Air | 83.7 |
| 10 | $\beta$-spodumene, $LiOH \cdot H_2O$, $\alpha$-$Al_2O_3$, $SiO_2$ | 55.4 | 41.6 | 3.0 | 1450 | 5 | none | | none | | Air | 87.5 |
| 11 | $\beta$-spodumene, mullite | 55.4 | 41.6 | 3.0 | *1450 | 0.5 | 700 | 2 | 1300 | 5 | Air | 94.9 |
| 12 | $\beta$-spodumene, mullite | 55.4 | 41.6 | 3.0 | 1450 | 5 | none | | none | | Air | 91.7 |
| 13 | $\beta$-spodumene, mullite, 4.5 wt % $SiO_2$ | 52.7 | 44.5 | 2.8 | *1450 | 0.5 | 700 | 2 | 1300 | 5 | Air | 91.6 |
| 14 | $\beta$-spodumene, mullite, 7.0 wt %, $SiO_2$ | 51.5 | 45.8 | 2.7 | *1450 | 0.5 | 700 | 2 | 1300 | 5 | Air | 90.9 |

| Ex. | Phase Composition of Final Fired Body by X-ray Diffraction Analysis (wt %) |
|---|---|
| 1 | ~60% Mullite, ~35% beta spodumene, ~5% $\alpha$-$Al_2O_3$ |
| 2 | ~60% Mullite, ~35% beta spodumene, ~5% $\alpha$-$Al_2O_3$ |
| 3 | Major amount mullite, Minor amounts $\alpha$-$Al_2O_3$, LAS**, glass |
| 4 | 63% Mullite, <35% beta spodumene, ~5% $\alpha$-$Al_2O_3$ + glass |
| 5 | Major amount mullite, Minor amounts $\alpha$-$Al_2O_3$, LAS**, glass |
| 6 | Major amount mullite, Minor amounts $\alpha$-$Al_2O_3$, LAS**, glass |
| 7 | — |
| 8 | Not significantly different from Example 5 |
| 9 | |
| 10 | — |
| 11 | ~60% Mullite, ~35% beta spodumene, ~5% $\alpha$-$Al_2O_3$ |
| 12 | — |
| 13 | ~62% Mullite, ~36% beta spodumene, ~2% $\alpha$-$Al_2O_3$ and barely detectable |

TABLE 1-continued

| 14 | ~63% Mullite, ~37% beta spodumene |

*Sample prefired in air at 1400° C., 2h
**LAS: Lithium aluminum silicate identified as virgilite ($Li_xAl_xSi_{3-x}O_6$)

Examples 1, 2, 11, 13 and 14 illustrate the present invention. The fired disc, i.e. the present polycrystalline body, produced in Examples 1, 2, 11, 13 and 14 would be useful as a supporting substrate for a silicon chip in a semiconductor device, and more particularly, as a supporting substrate for a silicon chip or other semiconductor in information processing equipment such as computers.

The present polycrystalline body produced in Example 11 had a thermal expansion coefficient measured to be $2.5 \times 10^{-6}$ at 300° K. and a dielectric constant of 6.5 at room temperature, i.e. about 25° C. Also, the polycrystalline body produced in Example 11 was used to produce all of the solid lines in FIG. 3 which illustrates that it had a thermal expansion coefficient that closely matched that of Si over the shown temperature range.

In Example 13, the excess silica admixed with the starting powders significantly reduced the amount of $\alpha-Al_2O_3$ phase in the final polycrystalline body and resulted in a beta spodumene phase which was more silica rich than the starting beta spodumene powder.

In Example 14, the excess silica admixed with the starting powders produced a polycrystalline body which did not have any $\alpha-Al_2O_3$ phase detectable by X-ray diffraction analysis and resulted in a beta spodumene phase which was more silica rich than the starting beta spodumene powder.

In Example 14, a polished cross-section of the resulting fired disc, i.e. the present polycrystalline body, is shown in FIG. 1. FIG. 1 shows that the disc is comprised of mullite (lighter phase) and beta spodumene (darker colored phase). FIG. 1 illustrates that the present body of this composition has a continuous interconnecting phase of beta spodumene.

Example 2 shows that a crystallization-annealing temperature of 1200° C. was operable to produce the present product.

Example 3 shows that a crystallization-annealing temperature of 1100° C. was not operable to produce the present product.

Example 4 shows that without the present nucleation-annealing, the present product was not produced. The resulting fired disc in Example 4 contained more than 5% by volume of glassy phase, and from about 40% to about 60% by volume of its beta spodumene phase was not crystalline.

Examples 5, 6 and 8 illustrate that without the present nucleation and crystallization-annealings, the present polycrystalline body was not produced.

Although Examples 5–10 and 12 did not produce the present polycrystalline body, they do illustrate the effect of sintering temperature and starting powders on the density of the final product.

EXAMPLE 15

This is a paper example.

Two pellets, i.e. green discs, are prepared according to the present invention according to the disclosure of Example 1. Each disc has the same composition as disclosed for Example 1.

Tungsten ink in the form of an X is brushed on one surface on one of the discs. A sandwich of the two discs with the deposited tungsten ink between them is formed and sintered at 1450° C. for 30 minutes. The temperature is then lowered to 700° C. where it is held for 2 hours to nucleate the glassy beta spodumene phase. The temperature is then raised to 1300° C. where it is held for 2 hours to crystallize the beta spodumene phase. The resulting fired body is then furnace cooled to ambient temperature. All firing, i.e. sintering, nucleation- and crystallization-annealing is carried out in wet hydrogen having a dew point of 25° C. at ambient pressure, and the fired body is cooled in the same atmosphere.

The resulting product, i.e. body, should have a density greater than 90% of its theoretical density.

The low oxygen partial pressure, which is necessary to prevent the oxidation of the tungsten, should result in some volatization of SiO from the surface of the ceramic. However, this should result only in the slight depletion of beta spodumene only on the surface as should be indicated by X-ray diffraction and would not be considered significant.

In this paper example, the resulting fired ceramic product should have a high electrical resistivity on the order of 10—ohms at 25° C. The tungsten interconnects should have sintered to sufficient density to provide a continuous electrical pathway through the assembly. The high resistivity of the ceramic in conjunction with the electrical continuity of the tungsten would make the present polycrystalline body useful in ceramic packaging of semiconductors.

In copending U.S. patent application Ser. No. 616,748, filed on June 4, 1984, entitled MULLITE-CORDIERITE COMPOSITE CERAMIC, filed in the name of James D. Hodge and assigned to the assignee hereof and incorporated herein by reference, there is disclosed a method for producing a polycrystalline body comprised of from about 50% by weight to about 95% by weight of mullite and from about 5% by weight to about 50% by weight of cordierite, said body having a porosity of less than about 10% by volume.

What is claimed is:

1. A process for producing a polycrystalline body comprised of from about 50% by weight to about 95% by weight of crystalline mullite phase and from about 5% by weight to about 50% by weight of crystalline beta spodumene phase which comprises providing a mixture comprised of mullite and/or beta spodumene and/or $Al_2O_3$ and/or $SiO_2$ and/or a precursor for $Li_2O$, said mixture having a composition required to produce said polycrystalline body, shaping said mixture into a compact, sintering said compact at a temperature ranging from greater than 1423° C. to about 1500° C. at which sufficient liquid phase is generated to liquid phase sinter the compact and produce a densified body having a density greater than about 85% of the theoretical density of said body, said sintering temperature having no significant deleterious effect on said compact or body, said sintered body containing said mullite phase and a glassy phase of beta spodumene, nucleation-annealing said sintered body at a temperature ranging from about 600° C. to about 800° C. to nucleate said glassy beta spodumene phase, crystallization-annealing the resulting nucleated body at a temperature ranging from about 1200° C. to below the temperature at which liquid forms in said body to produce said polycrystalline body, said sintering, said nucleation-annealing and said crystallization-annealing being carried out in an atmosphere or vacuum which has no significant deleterious effect on said compact or body, and said body does not contain a phase of silica.

2. The process according to claim 1 wherein said nucleation-annealing temperature ranges from about 650° C. to about 750° C.

3. The process according to claim 1 wherein said atmosphere is selected from the group consisting of air, hydrogen, wet hydrogen, nitrogen, argon and mixtures thereof.

4. The process according to claim 1 wherein said compact is in the form of a tape.

5. The process according to claim 1 wherein said polycrystalline body is comprised of from about 60% by weight to about 70% by weight of said mullite and from about 30% by weight to about 40% by weight of said beta spodumene.

6. The process according to claim 1 wherein said polycrystalline body is comprised of about 37% by weight of said beta spodumene and about 63% by weight of said mullite.

7. A polycrystalline body comprised of crystalline mullite in an amount ranging from about 50% by weight to about 95% by weight of the total weight of the body and crystalline beta spodumene in an amount ranging from about 5% by weight to about 50% by weight of the total weight of the body, said body having a density greater than about 85% of the theoretical density of said body, and said body does not contain a phase of silica.

8. The polycrystalline body of claim 7 in the form of a sheet.

9. A polycrystalline body comprised of crystalline mullite ranging from about 60% by weight to about 70% by weight of the total weight of the body, and crystalline beta spodumene ranging from about 30% by weight to about 40% by weight of the total weight of the body, said body having a density greater than 85% of the theoretical density of said body, and said body does not contain a phase of silica.

10. The polycrystalline body of claim 9 in the form of a sheet.

11. A polycrystalline body comprised of about 63% by weight of polycrystalline mullite and about 37% by weight of polycrystalline beta spodumene, said body having a density greater than 85% of the theoretical density of said body, and said body does not contain a phase of silica.

12. The polycrystalline body of claim 11 wherein said density is greater than 90%.

13. A polycrystalline body comprised of crystalline mullite in an amount ranging from about 50% by weight to about 95% by weight of the total weight of the body, crystalline beta spodumene in an amount ranging from about 5% by weight to about 50% by weight of the total weight of the body, $\alpha\text{-}Al_2O_3$ phase ranging up to about 11% by weight of the total weight of the body and a glassy phase ranging from a detectable amount up to about 5% by volume of the total volume of said body, said body having a density greater than 85% of the theoretical density of said body, said body having a dielectric constant ranging from higher than 6 to lower than 7 at 300° K., and said body does not contain a phase of silica.

14. A polycrystalline body comprised of crystalline mullite in an amount ranging from about 60% by weight to about 70% by weight of the total weight of the body, crystalline beta spodumene in an amount ranging from about 30% by weight to about 40% by weight of the total weight of the body, $\alpha\text{-}Al_2O_3$ phase ranging up to about 11% by weight of the total weight of the body and a glassy phase ranging from a detectable amount up to about 5% by volume of the total volume of said body, said body having a density greater than 85% of the theoretical density of said body, said body having a dielectric constant ranging from greater than 6 to lower than 7 at 300° K., and said body does not contain a phase of silica.

15. A polycrystalline body comprised of crystalline mullite phase in an amount ranging from about 50% by weight to about 95% by weight of the total weight of the body and crystalline beta spodumene phase in an amount ranging from about 5% by weight to about 50% by weight of the total weight of the body, said mullite phase being comprised of from about 71.8 weight % to about 74.0 weight % $Al_2O_3$ balance $SiO_2$, said beta spodumene phase being comprised of from about 58.5 weight % to about 79.4 weight % $SiO_2$ balance $Li_2O\cdot Al_2O_3$, said body having a density greater than 85% of the theoretical density of said body, and said body does not contain a phase of silica.

* * * * *